Feb. 10, 1959 G. E. LEWIS 2,872,940
ELECTRICAL CONTROL AND INDICATING SYSTEM
Filed Oct. 17, 1956 2 Sheets-Sheet 2
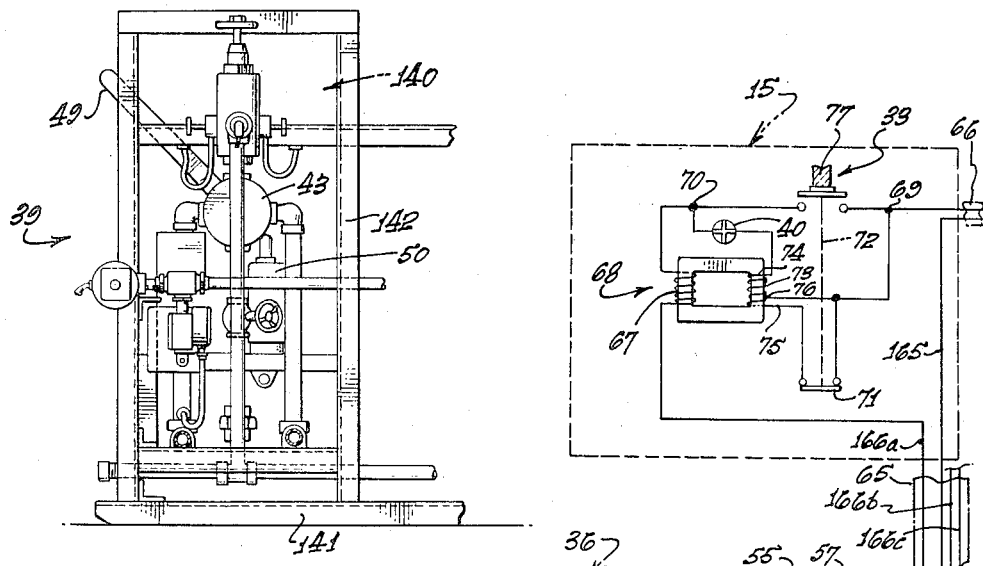
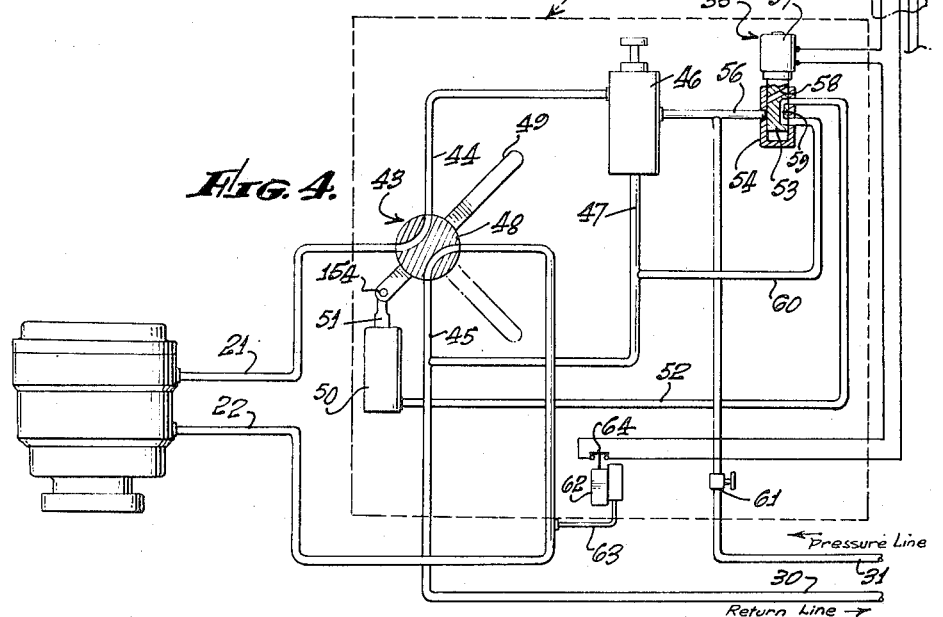
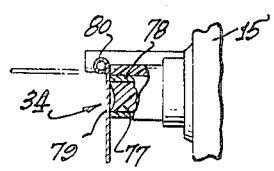
George E. Lewis,
INVENTOR.

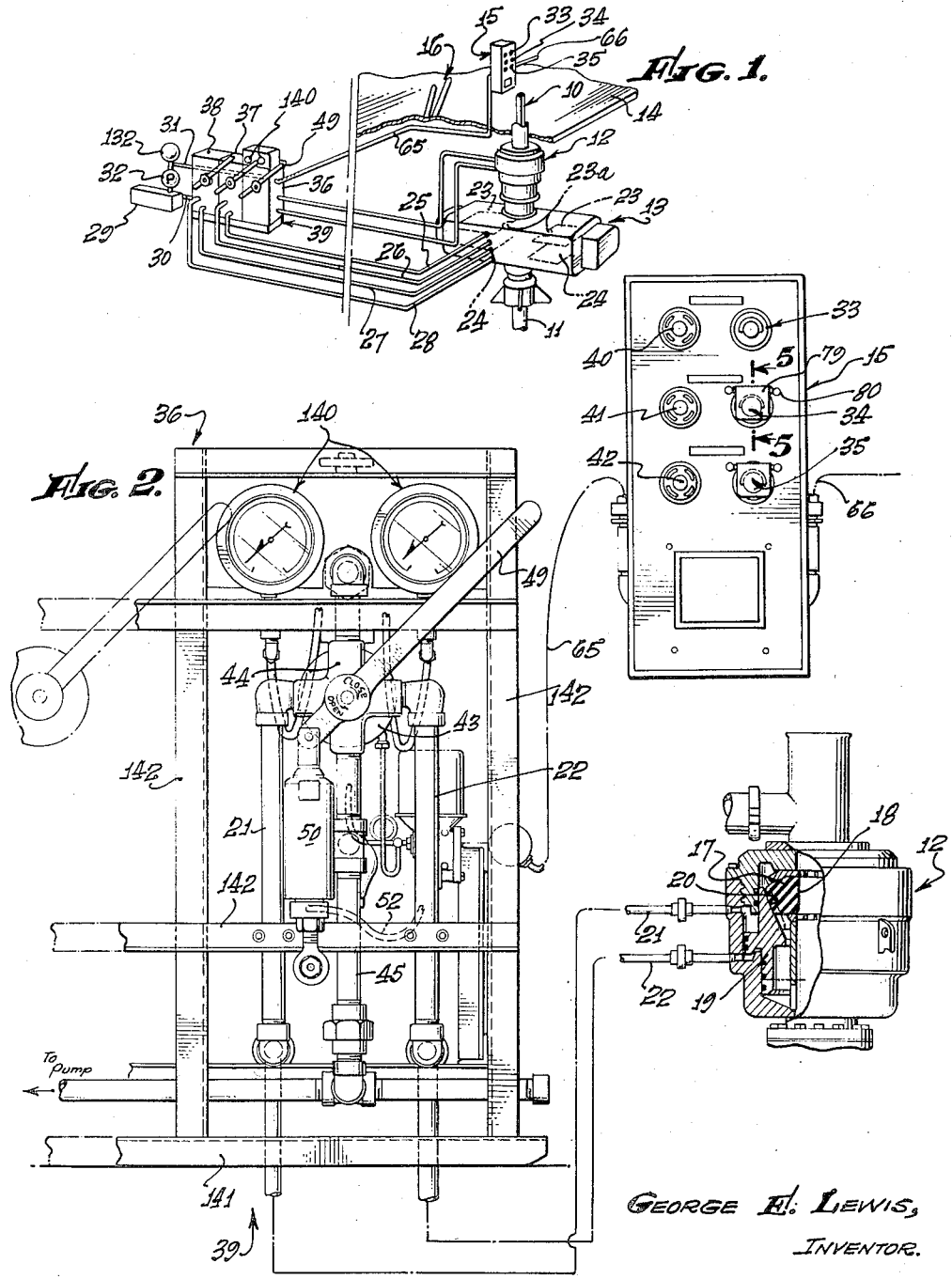

United States Patent Office 2,872,940
Patented Feb. 10, 1959

2,872,940

ELECTRICAL CONTROL AND INDICATING SYSTEM

George E. Lewis, Arcadia, Calif., assignor to Hydril Company, Los Angeles, Calif., a corporation of Ohio Application October 17, 1956, Serial No. 616,568

23 Claims. (Cl. 137—554)

This invention relates to an improved electrical circuit for controlling and indicating the condition of a power actuated unit. As will appear, the circuit is in certain respects particularly effective for controlling a hydraulically actuated blowout preventer for a well.

During the drilling of a well, it is customary to protect the well against blowing out by provision of a device called a "blowout preventer" which is in constant readiness for use. If the well begins to blow out, the preventer may then be actuated to rapidly seal off the upper end of the well, and thus prevent the escape of any liquid from the well. Such a preventer is usually designed for hydraulic actuation to its active closed condition with the closing action being initiated by the opening of a valve which controls the supply of pressure fluid to the preventer.

It is of course extremely important that any control apparatus for a well blowout preventer be extremely reliable in operation, since any delay in closing the well after a blowout begins may result in considerable damage to the well and the drilling apparatus, or injury to the personnel. With this in mind, the general object of the present invention is to provide an electrical control system having such inherent dependability as to be entirely practical for use in controlling a blowout preventer, or for controlling other types of equipment in which extreme reliability is essential. To obtain such reliability, the apparatus is designed to give certain indications to an operator which will keep the operator continuously apprised of the condition of the preventer and its energizing circuit. More specifically, the apparatus gives two different types of indications. In the first place, if the main control or energizing circuit is in any way accidentally broken, this fact is immediately indicated to the operator so that a repair may be made. And secondly, if and when the circuit is energized to close the preventer, the apparatus is designed to give a positive indication to the operator when a predetermined pressure has been applied to the closing chamber of the preventer. Further, the apparatus gives both of these indications with an absolute minimum of equipment and wiring, and preferably using only one indicating lamp for the two indications.

Conventional systems for the operation of blowout equipment require that high pressure hydraulic lines for controlling the equipment be run to the drillers position on the derrick floor, and there connect into a manifold or control valve assembly by which the driller controls the operation of the preventer. A further object of the present invention is to provide a control system in which only electric lines need extend to the drillers station, so that all of the hydraulic lines and the control manifold may remain below or remote from that location (or even run underground). Specifically, the hydraulic lines may extend directly from the preventer and below the derrick floor to a master control manifold located remote from both the preventer and the drillers station. The manifold may then be controlled remotely and electrically from the drillers station.

By thus keeping all of the hydraulic equipment below the derrick floor, I eliminate the possibility of damaging or rupturing the hydraulic lines or manifold, and thus losing complete control of the preventer, should any of the heavy drilling tools on the derrick floor accidentally strike the hydraulic equipment, or should any debris blown from the hole during a sudden blowout fall on the equipment. If the electrical control apparatus is in any way damaged or rendered inaccessible by a blowout, the preventer can still be operated manually from the remote location of the master hydraulic manifold. Also, such positioning of the hydraulic equipment introduces an additional safety feature in the event of fire, since there is always extreme heat above the derrick floor during a fire, whereas it is relatively cool below the derrick floor due to the heavy natural updraft. Finally, the discussed positioning of the hydraulic parts reduces the time necessary for initially setting up a rig at a particular location.

Structurally, an arrangement embodying a push button type switch, connected into and controlling the main energizing circuit to the electrical apparatus being controlled. Across this main switch there is provided a shunt circuit, which contains the indicator light or element, and through which a small current by-passing the switch flows while the switch is opened. If this light or indicator then goes out while the switch remains open, it indicates that there is a break at some point in the control circuit.

When the switch is closed, the energizing current to the apparatus being controlled passes through the primary of a transformer, whose secondary is connected into the shunt circuit in a relation to continue the energization of the indicator. When the closure of the circuit has resulted in the completion of a desired predetermined operation (for example, when closing pressure has been applied to an associated blowout preventer), an automatic switch opens the main circuit to deenergize the indicator and thus apprise the operator of the completion of the operation.

In order to prevent any possibility of accidental energization of the main control circuit through the shunt circuit which is connected across the main switch, the light bulb or other indicator is preferably connected into the shunt circuit in series in such a manner as to act as a current limiting device, to at all times prevent the flow of sufficient current through the shunt circuit to unintentionally actuate the unit being controlled. Thus, even though a short circuit develops in the transformer coil itself, the apparatus cannot be unintentionally energized.

The above and other features and objects of the present invention will be better understood from the following detailed description of the typical embodiment illustrated in the accompanying drawings in which:

Fig. 1 is a fragmentary diagrammatic perspective view of a well drilling rig, having a blowout preventer system constructed in accordance with the invention;

Fig. 2 is an enlarged partially diagrammatic view of the Fig. 1 apparatus, but showing only one of the sections of the hydraulic manifold assembly;

Fig. 3 is a rear view of the section of the manifold assembly whose front elevational appearance is shown in Fig. 2;

Fig. 4 is a diagrammatic representation of the electrical and hydraulic control system for the upper blowout preventer, and Fig. 5 is an enlarged sectional view taken essentially on line 5—5 of Fig. 2.

Referring first to Fig. 1, the well drilling rig there shown includes a conventional drill string 10 extending downwardly into the well within the casing 11, and through a blowout preventer 12 and a bore closing ram assembly 13. The derrick floor is represented at 14, with blowout preventer control panel 15 being provided at a location which is easily accessible to the driller as he stands on the platform 14 at the conventional control station where the various controls 16 for actuating the drilling mechanism are located.

With reference now to Fig. 2, the primary blowout preventer 12 is of a conventional type, such as that shown in U. S. Patent No. 2,609,836 and is capable of completely closing off all fluid flow upwardly from the well whenever desired, and regardless of whether or not the drill string 10 is positioned within the preventer. This device 12 may be typically described as including a massive annular rubber sealing element 17, containing an opening 18 through which the drill string 10 or other well apparatus may extend downwardly, and which element is adapted to be constricted or cammed radially inwardly to a closed bore sealing condition by upward movement of an actuating piston 19 engaging element 17 at conical surfaces 20. Piston 19 is actuable downwardly to its bore opening position by pressure fluid admitted to the upper side of the piston through line 21. Conversely, the piston is actuable upwardly, to close the bore, by hydraulic pressurized fluid admitted to the underside of the piston through line 22. The rubber of element 17 is sufficiently deformable to conform to, and form a seal with, the outer surface of any size drill pipe, enlarged joints, noncircular kelly, or any other member which may be received within the preventer. Further, if no such member is present in the preventer when piston 19 is is actuated upwardly, the piston movement continues upwardly until the central opening 18 in element 17 is completely closed.

The secondary blowout preventing ram assembly 13 is also of conventional construction, and may be described very generally as including an upper pair of horizontally opposed hydraulically actuated pipe rams 23, and a lower pair of horizontally opposed "blind rams" 24, also hydraulically actuated. When hydraulic pressure fluid is admitted to the upper rams 23 through line 25, with pressure being relieved through a second line 26, the two rams 23 are actuated relatively together and against the drill string or other pipe 10, so that the semicircular recesses 23a in the two rams 23 embrace the pipe and form a fluid-tight seal if a particular size pipe is in the unit 13 at the time that the rams are actuated. The two rams 23 are retracted relatively apart by the admission of pressure fluid to the rams through line 26, and the discharge of pressure fluid through line 25.

The second set of rams 24 are similar to rams 23 but do not contain the recesses 23a, and consequently are utilized to completely close the bore when no pipe or other member is present within unit 13. These two rams are actuable relatively together by admission of pressure fluid to them through a line 27, and are actuable apart by pressure fluid admitted through line 28, the fluid of course being discharged through the opposite line in either case.

The pressurized liquid for actuating primary blowout preventer 12 and the two sets of rams 23 and 24 is supplied by a pump 32 and accumulator 132, in which a body of liquid under pressure (say about 1500 p. s. i.) is maintained at all times. The pressurized liquid flows from this accumulator 132 through a line 31 to a manifold assembly 39 and returns from the manifold assembly through a line 30 to a reservoir 29 and pump 32, which then forces the liquid under pressure back into the accumulator 132. The flow of hydraulic fluid to and from the preventer and rams is controlled by three push button switches 33, 34 and 35 on panel 15, which actuate three substantially identical sections 36, 37 and 38 respectively of manifold assembly 39. The first of the push buttons 33 and the associated manifold section 36 control the delivery of hydraulic fluid to and from primary blowout preventer 12. Similarly, the second push button switch 34 and manifold section 37 control the flow of hydraulic fluid to and from pipe rams 23, while switch 35 and section 38 control blind rams 24. Associated with each of the push button switches 33, 34 and 35, there is provided an indicator light 40, 41 or 42, for indicating the condition of the circuits and apparatus being controlled. Since the three manifold sections 36, 37 and 38, and their electrical control circuits, are identical (except that the first section 36 typically has a pressure indicating gauge assembly 140 at its top), I will describe in detail only this first manifold section 36 and the associated circuit.

Referring now to Figs. 2 and 3, the three manifold sections 36, 37 and 38 are mounted on a common support structure 141, and each of the sections may include suitable rigid metal frame members 142 forming a frame structure to which the various valves and other parts of the section are rigidly mounted. Each section includes a conventional four-way valve 43, into the upper end of which pressurized liquid is admitted through a line 44, and from the lower end of which liquid is discharged through a return line 45 leading back to reservoir 29. In section 36, the two lines 21 and 22 from preventer 12 are connected into the opposite sides of the four-way valve, and in the other two sections 37 and 38, the two corresponding lines 25 and 26 or 27 and 28 are similarly connected into the sides of the corresponding four-way valve.

The pressure fluid from line 31 may pass through a pressure regulator valve 46 before flowing into line 44 leading to the upper side of the four-way valve. Also, there may be provided a pressure bypassing line 47 leading excess fluid from regulator valve 46 to the discharge line 45. The rotor or valve element 48 of the four-way valve 43 is rotatable between two flow reversing positions by means of a conventional actuating handle 49, which moves between the full line and broken line positions of Fig. 4. In the full line position of handle 49, valve 43 passes fluid from line 44 into line 21 leading to the upper side of piston 19, and valve 43 discharges fluid from the underside of piston 19 through lines 22 and 45. In the broken line position of handle 49, these connections from lines 44 and 45 to lines 21 and 22 are reversed.

The valve element 48 is adapted to be power actuated from the full line position to the broken line position of Fig. 4 by means of a piston and cylinder mechanism 50, whose piston and piston rod 51 are actuable upwardly when pressure fluid is admitted into line 52 past a solenoid actuated vertically movable valve element 53. The upper end of rod 51 may be pivotally connected to an extension of lever 49 by pin 154 to effect such actuation of the valve when pressure fluid is admitted to the lower end of the cylinder. As will be apparent from Fig. 4, pressure fluid from line 31 is admitted to the stationary outer part 54 of the solenoid valve 55 through a line 56, and when the valve element 53 is in its lowermost position (upon energization of control solenoid 57) pressure fluid flows from line 56 through a passage 58 in valve element 53 and into line 52 leading to the cylinder of mechanism 50. When valve element 53 is in its upper position of Fig. 4, to which position the element is spring urged when solenoid 57 is deenergized, line 52 is connected by passage 59 in valve element 53 with a line 60 leading to the discharge line 30.

The parts 43, 50 and 55 of each manifold section 36, 37 and 38 as well as the interconnecting pipes, and an additional shut-off valve 61, are all suitably mounted at fixed positions to the framework 142 of the manifold. Similarly, there is mounted to this framework in each section a pressure actuated electric switch 62, which is subjected through line 63 to the pressure in line 22 (or line 25 or 27 in the other sections). This switch 62 is normally spring urged to circuit closing position, but is adapted to open the circuit across its contacts 64 when the pressure in line 22 reaches a predetermined value, say about 750 p. s. i., which pressure is attained when preventer 12 is being actuated to its closed condition. Similarly, the corresponding pressure actuated switch of each of the other manifold sections 37 and 38 is adapted to open a similar electric circuit when the pressure fed through line 25 or 27 has closed the associated rams 23 or 24.

The contacts 64 of the switch 62 are connected in series with the actuating solenoid 57 of solenoid valve 55, and the leads of this series circuit are then connected to a rather long cable 65 leading to control panel 15. Electric power is fed to the panel 15 through another cable 66, the power typically being 110 volt A. C. 60 cycles. Connected into the main series circuit including solenoid 57 and switch 62 is the main push button actuated control switch 33, which is normally spring urged to an open position. Also, connected into this series circuit is the primary coil 67 of a transformer 68.

Connected in parallel with switch 33, there is formed a shunt circuit, extending from point 69 to point 70 in Fig. 4, and into which the indicator light 40 is connected in series. This shunt circuit includes also the secondary coil 73 of transformer 68, and a switch 71 connected into the shunt circuit in the manner illustrated. The movable contact of switch 71 is mechanically connected to the movable contact of switch 33, as represented at 72, for actuation therewith, with switch 71 being normally closed and adapted for actuation to opened condition as the normally opened switch 33 is closed.

One side of indicator light 40 is electrically connected to point 70 between switch 33 and the primary coil 67 of transformer 68. The other side of light 40 is connected to one end 74 of secondary coil 73 of the transformer, whose other end 75 is connected to one side of switch 71. The second side of switch 71 is electrically connected to point 69 in the main circuit, and also to an intermediate point 76 on secondary coil 73. This intermediate point 76 is preferably considerably closer to the end 75 of coil 73 than to its end 74. If desired, secondary coil 73 could be wound with the proper number of turns so that the connections to points 75 and 76 could be reversed from the condition in which they are shown. However, I normally prefer to make the connections as shown.

Each of the three push button switches 33, 34 and 35 on panel 15 is connected into an individual control circuit and hydraulic control system which is identical with that shown in Fig. 4 for the first of these switches 33. The transformers 68 and switches 71 of these various circuits are of course suitably mounted to the rear of panel 15. As best seen in Figs. 2 and 5, each of the push button switch units includes a finger actuated axially movable push button member 77, which is contained and movable within a tubular guide element 78, which is in turn suitably attached in fixed relation to panel 15. The inner movable push button element 77 of upper switch 33, which controls the primary blowout preventer 12, is at all times freely accessible to an operator, to be easily actuable in time of emergency. The push button elements 77 of the other two switches 34 and 35, on the other hand, are normally hidden behind individual swinging doors or covers 79, which are hinged at 80 for swinging movement between the full line closed position of Fig. 5 and the broken line open position of that figure. In the closed full line position of element 79, it extends vertically across the forward face of the associated push button, and engages the periphery of tubular member 78, within which push button element 77 is then protected against actuation. Pressure exerted rearwardly against member 79 cannot actuate the push button, so that the button cannot be operated until element 79 is purposely swung to its broken line position. Thus, there is no danger of accidental actuation of the rams 23 or 24, when it is desired to set the primary preventer 12.

To now describe the operation of the illustrated apparatus, assume first that the aparatus is in normal drilling condition, with a drill string 10 extending downwardly through the blowout preventer units 12 and 13 and into the well. During such drilling, preventer 12 and the two sets of rams 23 and 24 are all in their opened positions, so that they do not interfere with the operation of the drill string. To maintain the various fluid actuated parts in these opened conditions, all three of the valve actuating handles 49 of the three manifold sections 36, 37 and 38 are in their full line positions of Fig. 4 and the other figures, so that the high pressure line 31 from accumulator 132 is connected through valves 46 and 43 with lines 21, 25 and 27; while the lines 22, 26 and 28 are connected through valves 43 with return line 30 leading back to reservoir 29, pump 32 and the accumulator 132. Also, during normal drilling, the three solenoid valves 55 of sections 36, 37 and 38 are all in the deenergized position of valve 55 in Fig. 4, and switch 33 in each of the three circuits is open, while the associated switch 71 is closed.

With the parts in their described normal drilling condition, the small test current flows through the electrical circuit, including solenoid 57 and the normally closed pressure responsive switch 64, and also including the relatively long cable 65 leading from manifold 39 to the remote control panel 15. This small current passes through light bulb 40 to thus continuously test the entire circuit, including both transformer coils, the cable, solenoid valve, and pressure actuated switch, to make certain that the circuit is at all times in readiness for full energization to close the associated blowout preventer. More specifically, the described small test current flows through a shunt circuit which extends about or in parallel with switch 33. This circuit extends from point 69 at one side of switch 33 to intermediate point 76 of transformer coil 73, to then flow through the upper portion of that coil and through light bulb 40 to point 70, from which the current may flow through coil 67, cable 65, solenoid 57, and the normally closed contacts 64 of switch 62. This current is limited by the impedance of coils 73 and 67 and by the resistance of the filament of light bulb 40, so that the small test current cannot under any circumstances reach a value sufficient to actuate solenoid valve 55 downwardly from its normal upper position. The normally closed switch 71 closes a short circuit about the lower portion of coil 73, so that a current can be induced in that portion of the coil and the short circuit by the autotransformer action resulting from the passage of current through the upper portion of coil 73. The flow of this induced current in the closed circuit including the lower portion of coil 73 results in a reduction in the overall impedance of coil 73, so that the desired small current can flow through the light bulb 40 and the rest of the defined test circuit (everything but switch 33). With regard to the design of the circuit to definitely limit the amount of the test current under all circumstances, it is particularly noted, that, even if a short circuit develops in coil 73 of transformer 68, so that this coil is in effect completely shorted out, the series connected light bulb 40 still functions as a current limiting device which positively prevents the flow through the shunt circuit and about switch 33 of sufficient current to energize solenoid 57 and thus inadvertently close preventer 12 or rams 23 or 24.

If the well begins to blow out, the operator presses the push button on switch 33 associated with preventer 12, to close that switch and open the associated normally closed switch 71. Accidental actuation of either of the other two ram controlling switches 34 or 35 is prevented by provision of the disussed closure or door elements 79 of Figs. 2 and 5. When switch 33 is closed, this closes a circuit directly from point 69 to point 70 in Fig. 4, so that an energizing current can flow from point 70 through coil 67, cable 65, solenoid 57, and the normally closed switch 64, and this current is sufficient to energize solenoid 57 and move the solenoid and associated slide valve element downwardly, to place line 56 in communication with line 52. Thus, pressure fluid from line 56 flows through passage 58 and line 52 to the cylinder of mechanism 50, to actuate piston rod 51 upwardly and thereby swing the four-way valve 43 to the position represented in broken lines in Fig. 4. Such actuation of the four-way valve reverses the connections between the pressure and return lines and lines 21 and 22, so that fluid from pressure line 31 and regulator 46 flows through the four-way valve and line 22 to the underside of piston 19, while the fluid from the upper side of the piston is returned through line 21 and the four-way valve to return line 30 leading back to the pump and accumulator. Thus, the pressure fluid commences to move piston 19 upwardly, and to thereby close rubber ring 17 to prevent further escape of fluid upwardly from the well. When the pressure in line 22 and the closing chamber of the preventer reaches the value for which switch 62 is set (say about 750 p. s. i.), this switch automatically opens and thus breaks the energizing circuit to indicator light 40. This, then indicates to the operator that the predetermined closing pressure has been applied to the preventer, which pressure is under normal circumstances sufficient to close the preventer.

The push button switch 33—71 need be held closed only long enough, upon each actuation, to actuate four-way valve 43 to the broken line position of Fig. 4. When switch 33—71 is pressed an operating current will flow through coil 67 of transformer 68. This operating current will induce by transformer action a current in coil 73 sufficient to light lamp 40 through the closed circuit from point 69 to 76 through coil 73, through lamp 40 to point 70, through closed switch 33 back to point 69. The push button switch may then be released, to allow return of solenoid valve 55, while the four-way valve will automatically remain in the broken line position. After such opening of switch 33, and the corresponding closure of the connected switch 71, the electrical circuit is returned to its original condition in which a small test current flows through light bulb 40 to still maintain it energized until pressure actuated switch 62 has opened in the manner discussed above to indicate the closing of the blowout preventer 12. When it is desired to again open the preventer, the lever or handle 49 of four-way valve 43 is manually returned to its full line position of Fig. 4, to return the piston 19 downwardly to its original preventer opening position.

After the primary blowout preventer 12 has been actuated to closed condition, it may be desirable to close rams 23 or 24. If this is desired, the rigid metal element 79 associated with the desired set of rams is swung upwardly to its broken line Fig. 5 position, and the associated push button element 77 may then be pressed inwardly to actuate the switches 33 and 71 of that circuit, and close the desired set of rams. The rams may then be opened by manual actuation of the corresponding lever 49. Of course, if desired, the closure of the preventer 12 or rams may also be effected manually, by actuation of lever 49, rather than by closure of the control switch.

At all times when the preventer and rams are open, the three indicator lights 40, 41 and 42 remain continuously illuminated as long as the three control circuits to the solenoids 57 are in proper condition, so that the small test currents can flow through those circuits and the indicator lights. If one of these lights goes out, at any time, it indicates that either the associated circuit has been broken at some point and should be repaired or the lamp has burnt out, or else the associated preventer or set of rams has had closing pressure applied thereto. Thus, the indicator lights give very positive indications of the factors which are critical, and do so without necessitating any more than a conventional operating cable 65 extending between the manifold 39 and the control panel 15. As will be apparent, the cable 65 may consist of a four line cable (see Fig. 4) with one of these lines 165 being common to all three of the control circuits, and the other three lines 166a, 166b, and 166c forming the connections between transformer coil 67 and solenoid 57 in the three circuits respectively.

While it will be apparent that electrical components of various values may be utilized in these circuits, I will for the sake of completeness of the disclosure list below the electrical characteristics of one set of components which will function together very efficiently when the energizing voltage at leads 66 is 110 volt 60 cycle alternating current:

(1) Transformer coil 67—64 turns of #16 copper magnet wire.

(2) Transformer coil 73—2600 turns of #28 copper magnet wire.

(3) Upper portion of transformer coil 73—2030 turns.

(4) Lower portion of transformer coil 73—570 turns.

(5) These two coils #67 and 73 being placed on the two opposite short legs of a core of laminated transformer iron having a cross sectional area of one quarter square inch and a 1½" x 2" window. The iron of this core should have a saturation point of from 60,000 to 65,000 lines per square inch.

(6) Light bulb 40—standard 6 watt 120 volt indicator lamp.

(7) Solenoid 57—has a rating of 120 volts 60 cycle and has an inrush current of 17.5 amps. and a holding current of 2.2 amps.

The saturation characteristics of the iron and the large leakage reactance of the transformer, having its coils on separate legs of the core, are important factors in the proper operation of this unit. The characteristics of the transformer as described above are such that with 17.5 amps. in coil 67 the voltage produced in the upper portion of coil 73 will be approximately 120 volts and with 2.2 amps. in coil 67 the corresponding voltage will be approximately 70 volts with the normal load of lamp 40 connected to the upper portion of coil 73 and switch 71 open. This arrangement then produces a rather limited change in the voltage (70 volts to 120 volts) applied to the lamp yet allowing the current in coil 67 to vary over a large range (2.2 amp. to 17.5 amp.) as required for the operation of the solenoid valve.

To define the characteristics of the transformer somewhat more broadly, it may be stated that the transformer should preferably be so designed that its core will be substantially saturated with magnetic flux when the current through coil 67 is considerably below the maximum current which is drawn by solenoid 57, and thus which flows through coil 67, during the time that the solenoid is energized. This prevents the induced voltage in coil 73 and thus the current in light bulb 40 from becoming excessive when the solenoid inrush current is flowing, yet allows a high enough voltage to be induced by the holding current to illuminate the light bulb 40.

I claim:

1. Apparatus for actuating a fluid operated well blowout preventer comprising a valve for controlling the passage of actuating fluid, electrically operated means controlling said valve, an electric circuit for feeding actuating current to said means and including a switch connected in series therewith to energize said means and thereby open said valve upon closure of said switch, a shunt circuit across said switch through which a reduced current flows in series with said valve controlling means when the switch is open, an indicator energized by said reduced current in the shunt circuit to test the circuit through said valve controlling means, a transformer having a first coil connected in series with said switch and said means and having a second coil energizing said indicator when the switch is closed, an automatic switch connected in series with said first switch, said means and said first coil of the transformer, and means for actuating said automatic switch in response to the pressure of actuating fluid on the outlet side of said valve and adapted to automatically open said automatic switch to deenergize the indicator when said valve outlet pressure increases to a predetermined value.

2. Apparatus as recited in claim 1, in which said valve controlling means include a solenoid for actuating the valve.

3. Apparatus as recited in claim 1, in which said indicator is an electric indicator light.

4. Apparatus as recited in claim 1, in which said transformer has a core which is saturated with flux when the current flowing through said first coil is considerably below the maximum current which flows through said electrically operated valve controlling means.

5. Apparatus for actuating a fluid operated well blowout preventer comprising a valve for controlling the passage of actuating fluid, electrically operated means controlling said valve, an electric circuit for feeding actuating current to said means and including a switch connected in series therewith to energize said means and thereby open said valve upon closure of said switch, a shunt circuit across said switch through which a reduced current flows in series with said valve controlling means when the switch is open, an indicator energized by said reduced current in the shunt circuit to test the circuit through said valve controlling means, a transformer having a first coil connected in series with said switch and said means and having a second coil at least a portion of which is connected into said shunt circuit and energizes said indicator when the switch is closed, said indicator being adapted to pass only a limited current therethrough and being connected into said shunt circuit in series with the rest of that circuit so that all of said reduced current must pass through the indicator and the latter therefore limits said reduced current under all circumstances at a value insufficient to actuate said valve controlling means, an automatic switch connected in series with said first switch, said means and said first coil of the transformer, and means for actuating said automatic switch in response to the pressure of actuating fluid on the outlet side of said valve and adapted to automatically open said automatic switch to deenergize the indicator when said valve outlet pressure increases to a predetermined value.

6. Apparatus as recited in claim 5, in which said indicator is an electric indicator light.

7. Apparatus as recited in claim 5, including a switch operable to close a short circuit about a portion of said second coil.

8. Apparatus as recited in claim 5, including a switch operable to close a short circuit about a portion of said second coil and connected to said first mentioned switch for opening movement upon closure of the first mentioned switch.

9. Apparatus as recited in claim 5, including a switch operable to close a short circuit about a portion of said second coil and connected to said first mentioned switch for opening movement upon closure of the first mentioned switch, said indicator being an electric indicator light.

10. Apparatus as recited in claim 5, including a switch operable to close a short circuit about a portion of said second coil and connected to said first mentioned switch for opening movement upon closure of the first mentioned switch, said indicator being an electric indicator light, said valve controlling means comprising a solenoid for actuating said valve.

11. Apparatus as recited in claim 5, in which said transformer has a core which is saturated with flux when the current flowing through said first coil is considerably below the maximum current which flows through said electrically operated means.

12. A combination comprising the apparatus recited in claim 11, and also including a fluid pressure operable blowout preventer connected to the outlet side of said valve and a source of pressure fluid connected to the inlet side of said valve as elements of said combination.

13. A combination comprising the apparatus recited in claim 1, and also including a fluid pressure operable blowout preventer connected to the outlet side of said valve and a source of pressure fluid connected to the inlet side of said valve as elements of said combination.

14. A combination comprising the apparatus recited in claim 5, and also including a fluid pressure operable blowout preventer connected to the outlet side of said valve and a source of pressure fluid connected to the inlet side of said valve as elements of said combination.

15. Apparatus comprising an electrically operated unit adapted when energized to initiate a predetermined operation, an electric circuit for feeding actuating current to said unit and including a switch connected in series therewith to energize said unit upon closure of the switch, a shunt circuit across said switch through which a reduced current flows in series with said unit when the switch is open, an indicator energized by said reduced current in the shunt circuit to test the circuit through said unit, a transformer having a first coil connected in series with said switch and said unit and having a second coil energizing said indicator when the switch is closed, an automatic switch connected in series with said first switch, said unit and said first coil, and means for actuating said automatic switch in response to the performance of said operation and adapted to automatically open said automatic switch to deenergize the indicator and unit when said operation has been performed.

16. Apparatus as recited in claim 15, in which said indicator is an electric indicator light.

17. Apparatus as recited in claim 15, in which said transformer has a core which is saturated with flux when the current flowing through said first coil is considerably below the maximum actuating current which flows through said unit upon closure of said first switch.

18. Apparatus as recited in claim 15, in which at least a portion of said second coil is connected into said shunt circuit, said indicator being adapted to pass only a limited current therethrough and being connected into said shunt circuit in series with the rest of that circuit so that all of said reduced current must pass through the indicator and the latter therefore limits said reduced current under all circumstances to a value insufficient to actuate said unit.

19. Apparatus as recited in claim 18, including a switch operable to close a short circuit about a portion of said second coil and connected to said first mentioned switch for opening movement upon closure of the first mentioned switch, said indicator being an electric light.

20. Apparatus for actuating a fluid operated well blowout preventer comprising a valve for controlling the passage of actuating fluid to a preventer, electrically operated means controlling said valve, an electric circuit for feeding actuating current to said means and including a switch connected in series therewith to energize said means and thereby close a controlled preventer upon closure of said switch, a shunt circuit across said switch through which a reduced current flows in series with said valve controlling means when the switch is open, an indicator energized by said reduced current in the shunt circuit to test the circuit through said valve controlling means, a transformer having coil means including a first coil connected in series with said switch and said means and a second coil energizing said indicator when the switch is closed, an automatic switch connected in series with said first switch, said means and said first coil of the transformer, and means for actuating said automatic switch in response to the pressure of actuating fluid applied to a controlled preventer, and adapted to automatically open said automatic switch to deenergize the indicator when closing pressure has been applied to a controlled preventer, and an additional switch for closing a short circuit about a portion of said coil means, to decrease the impedance of said second coil, when said first mentioned switch is open.

21. Apparatus as recited in claim 20, including means operatively connecting said additional switch to said first mentioned switch for opening movement in response to closure of the latter.

22. Apparatus comprising an electrically operated unit adapted when energized to initiate a predetermined operation, an electric circuit for feeding actuating current to said unit and including a switch connected in series therewith to energize said unit upon closure of the switch, a shunt circuit across said switch through which a reduced current flows in series with said unit when the switch is open, an indicator energized by said reduced current in the shunt circuit to test the circuit through said unit, a transformer having coil means including a first coil connected in series with said switch and said unit and a second coil energizing said indicator when the switch is closed, an automatic switch connected in series with said first switch, said unit, and said first coil, means for actuating said automatic switch in response to the performance of said operation, and adapted to automatically open said automatic switch to deenergize the indicator and unit when said operation has been performed, and an additional switch for closing a short circuit about a portion of said coil means, to decrease the impedance of said second coil, when said first mentioned switch is open.

23. Apparatus as recited in claim 22, including means operatively connecting said additional switch to said first mentioned switch for opening movement in response to closure of the latter.

References Cited in the file of this patent
UNITED STATES PATENTS
2,528,898    McIlvaine _____ Nov. 7, 1950